United States Patent Office 3,267,105
Patented August 16, 1966

3,267,105
1-METHYLTHIOACYL-BENZ[a]CYCLOPENTA[f] QUINOLIZINES AND PROCESS FOR THEIR PRODUCTION
Richard E. Brown, Hanover, and Robert I. Meltzer, Rockaway, N.J., assignors to Warner-Lambert Pharmaceutical Company, Morris Plains, N.J., a corporation of Delaware
No Drawing. Filed July 21, 1965, Ser. No. 473,840
4 Claims. (Cl. 260—286)

This invention relates to novel substituted quinolizines and more particularly it relates to novel substituted quinolizines of the formulas:

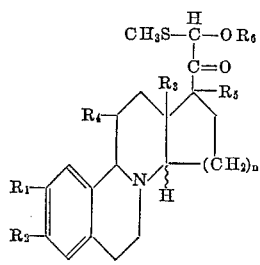

(I)

and

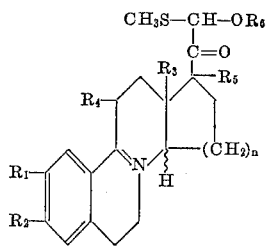

(II)

wherein $R_1$ and $R_2$ may be hydrogen, hydroxy or lower alkoxy of 1 to 6 carbon atoms such as methoxy, ethoxy and the like or methylene dioxy; $R_3$ may be hydrogen or lower alkyl of 1 to 6 carbon atoms such as methyl, ethyl, propyl, isopropyl and the like; $R_4$ may be hydrogen, hydroxy or a lower acyloxy group of 1 to 6 carbon atoms such as acetoxy, formyloxy and the like; $R_5$ may be hydrogen, hydroxy or a lower acyloxy radical of 1 to 6 carbon atoms such as acetoxy, formyloxy and the like; and $R_6$ is an acyl radical such as acetyl, formyl, propionyl, benzoyl, toluyl and the like and $n$ is an integer of from 1 to 2.

The numbering of the compounds of this invention when $n$ is 2 is as follows:

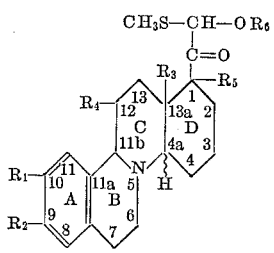

and when $n$ is 1 the numbering is as follows:

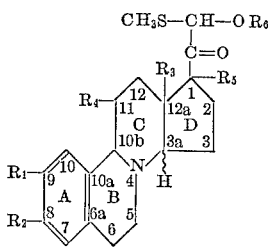

The compounds of this invention have steroidal-like activities and are useful in endocrine therapy. They also exhibit significant pharmacological activity on the cardiovascular system. In use, they may be combined with a nontoxic pharmaceutical carrier to form dosage forms such as tablets, capsules, solutions, suspensions, elixirs, suppositories and the like with the active ingredients being present from 1 to 500 mg. per dosage unit. They may also be combined with other therapeutic agents such as analgesics, for example, aspirin or namol xenyrate; antibiotics, for example, the tetracyclines or colimycin; cardiovascular agents, for example, PETN; anti-inflammatory agents, for example, β-methasone or β-methasone-17-valerate, or other steroids, for example, quingesterone to enhance and broaden their therapeutic spectrum. In addition, the compounds of this invention are useful as intermediates for the production of other novel substituted quinolizines of the formula:

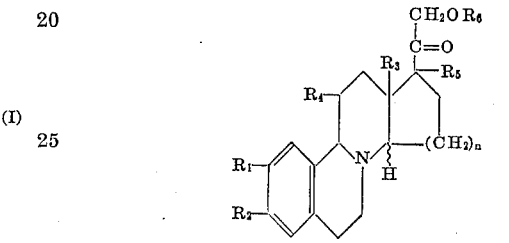

(III)

which are prepared from the compounds of this invention by desulfurization reactions.

According to the process of this invention, the above compounds (I) are prepared by reacting a compound of the Formula IV:

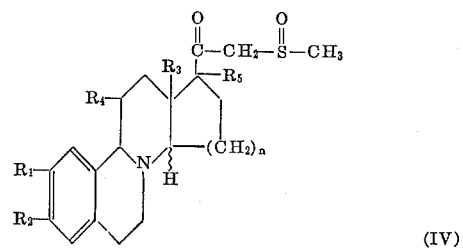

(IV)

with a carboxylic acid such as acetic acid. The reaction is effected by heating together the starting material and the acid on a steam bath for about 2 to 6 hours. The desired reaction product is recovered by removing the excess acid by distillation, adding an excess of a suitable base and partitioning the residue between water and a suitable solvent such as methylene chloride.

The corresponding quaternary salts (II) can be obtained from starting material such as V:

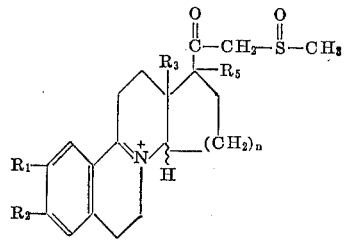

(V)

by treatment with a carboxylic acid such as acetic acid, removing the acetic acid by distillation and adding an acid such as perchloric acid to the reaction mixture and recovering the salt as a precipitate. The starting materials of Formulas IV and V, used in the above reaction, are prepared according to the directions described in our copending application, Serial No. 433,166 filed February 16, 1965, now U.S. Patent 3,222,368. The starting materials for compounds IV and V are keto lactams of Formula C below. These are prepared from $R_1$ and $R_2$ substituted phenylalkylamines of the general Formula A below and substituted ketoacids of the general Formula B below in accordance with the process described in our copending application Serial No. 318,190, filed October 23, 1963. The $R_1$ and $R_2$ substituted phenylalkylamines such as 3,4-diethoxyphenylethylamines are well known compounds which are described in the literature, for example in Chemical Abstracts, vol. 56, page 10006$^g$ and by Ide et al. in J.A.C.S., vol. 59, page 726 (1937). The ketoacids of Formula B are prepared according to the process described in our copending application Serial No. 310,146, filed September 19, 1963, using 2-$R_3$-cycloalkane-1,3-diones as starting material. Such 2-$R_3$-cycloalkane-1,3-diones are well known in the art and may be prepared according to the procedure of Panouse and Sannie published in Bull. Soc. Chim. France, 1955, page 1036. See also H. Smith, J.C.S., 1964, page 4472.

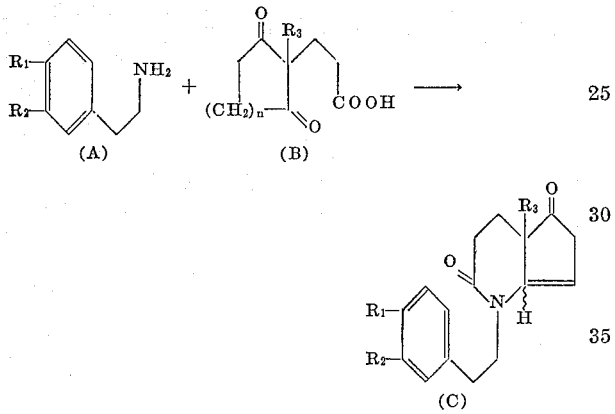

The keto lactam (C) is then cyclized with phosphorous oxychloride and converted to IV or V in accordance with the process set forth in our copending application Serial No. 248,872, filed January 2, 1963.

The compounds of this invention are obtained by the above-described process as a mixture of epimers about the carbon atom bearing the sulfur substituent and these epimers are also included within the scope of this invention.

The following examples are included in order further to illustrate the invention.

EXAMPLE 1

*1,2,3,3a,5,6,10b,11,12,12a - decahydro - 8 - methoxy-12a-methyl - 1-[acetoxy(methylthio)acetyl]benzo[a]cyclopenta[f]quinolizine*

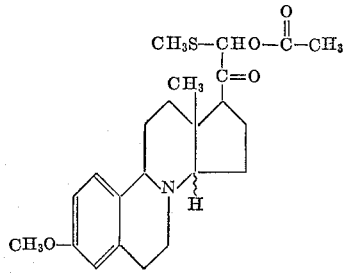

A solution of 2.0 g. of 1,2,3,3a,5,6,10b,11,12,12a-decahydro - 8 - methoxy-12a-methyl-1-(methylsulfinyl) acetyl-benzo[a]cyclopenta[f]quinolizine in 25 ml. of acetic acid is heated for 2 hours on a steam bath. The solution is concentrated to dryness and the residue is diluted with 20 ml. of water. The mixture is extracted well with methylene chloride. The methylene chloride solution is washed with 5% sodium bicarbonate solution, dried and the solvent is removed by distillation. The oily residue crystallizes slowly on standing to give 1,2,3,3a,5,6, 10b,11,12,12a - decahydro-8-methoxy-12a-methyl-1-[acetoxy(methylthio)acetyl]benzo [a] cyclopenta [f] quinolizine, as a solid mixture of epimers about the sulfur-bearing carbon atom, M.P. 94°–102° C. after recrystallization from ethanol.

EXAMPLE 2

*2,3,3a,5,6,11,12,12a - octahydro-8-methoxy-12a-methyl-1-[acetoxy(methylthio)acetyl] - 1H-benz[a]cyclopent[f] quinolizinium perchlorate*

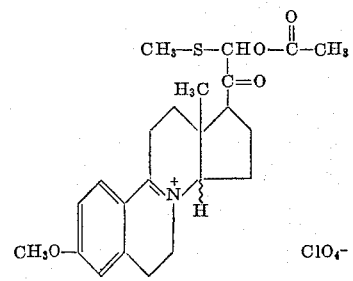

In the same way as described in Example 1, 1.0 g. of 1,2,3,3a,5,6,12,12a - octahydro-8-methoxy-12a-methyl-1-(methylsulfinyl)acetyl - benzo[a]cyclopenta[f]quinolizine is treated with acetic acid. The acetic acid is removed by distillation, the residue is taken up in water and an excess of 10% perchloric acid is added to the aqueous solution to give 2,3,3a,5,6,11,12,12a-octahydro-8-methoxy-12a - methyl-1-[acetoxy(methylthio)acetyl]-1H-benz[a] cyclopent[f]quinolizinium perchlorate as a pale yellow amorphous solid, M.P. 95°–102° C. The product shows strong sharp carbonyl bands in the infrared at 1710 and 1740 cm.$^{-1}$.

EXAMPLE 3

*1,2,3,3a,5,6,10b,11,12,12a - decahydro - 8 - methoxy-12a-methyl - 1-[acetoxy(methylthio)acetyl]1,11-dihydroxy-benzo[a]cyclopenta[f]quinolizine*

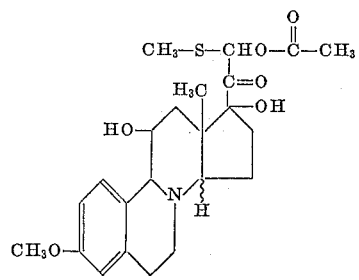

In the same way as described in Example 1, 1.0 g. of 1,2,3,3a,5,6,10b,11,12,12a - decahydro - 8 - methoxy-12a-methyl - 1-(methylsulfinyl)acetyl-1,11-dihydroxybenzo[a] cyclopenta[f]quinolizine gives 1,2,3,3a,5,6,10b,11,12,12a-decahydro-8-methoxy-12a-methyl-1-[acetoxy(methylthio) acetyl]1,11 - dihydroxybenzo[a]cyclopenta[f]quinolizine as an oily mixture of epimers about the carbon atom bearing the sulfur atom. One of the epimers can be obtained in crystalline form by triturating the oil with ethanol. This material melts at 157°–159° C. after recrystallization from ethanol.

It is understood that the foregoing detailed description is given merely by way of illustration and that many variations may be made therein without departing from the spirit of our invention.

Having described our invention, what we desire to secure by Letters Patent is:

1. A member of the group consisting of compounds of the formulas:

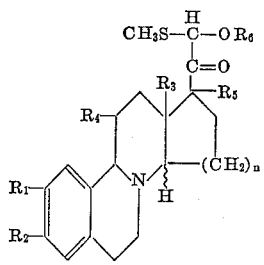

and

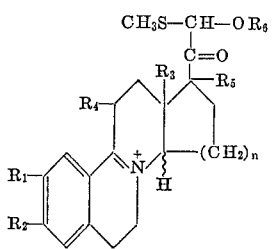

wherein $R_1$ and $R_2$ each are members selected from the group consisting of hydrogen, hydroxy, lower alkoxy and methylene dioxy; $R_3$ is a member of the group consisting of hydrogen and lower alkyl; $R_4$ is a member of the group consisting of hydrogen, hydroxy and lower acyloxy of a carboxylic acid; $R_5$ is a member selected from the group consisting of hydrogen, hydroxy and lower acyloxy of a carboxylic acid; $R_6$ is acyl of a carboxylic acid and $n$ is integer of from 1 to 2.

2. 1,2,3,3a,5,6,10b,11,12,12a-decahydro-8-methoxy-12a-methyl-1-[acetoxy(methylthio)acetyl]benzo[a]cyclopenta[f]quinolizine.

3. 2,3,3a,5,6,11,12,12a - octahydro - 8 - methoxy - 12a-methyl - 1-[acetoxy(methylthio)acetyl]-1H-benz[a]cyclopent[f]quinolizinium perchlorate.

4. 1,2,3,3a,5,6,10b,11,12,12a-decahydro - 8 - methoxy-12a - methyl - 1 - [acetoxy(methylthio)acetyl]1,11 - dihydroxybenzo[a]cyclopenta[f]quinolizine.

No references cited.

ALEX MAZEL, *Primary Examiner.*

DONALD G. DAUS, *Assistant Examiner.*